March 10, 1942. F. P. MALONEY 2,275,780
MACHINE AND METHOD OF FORMING MEAT
Filed Oct. 3, 1938 5 Sheets-Sheet 1
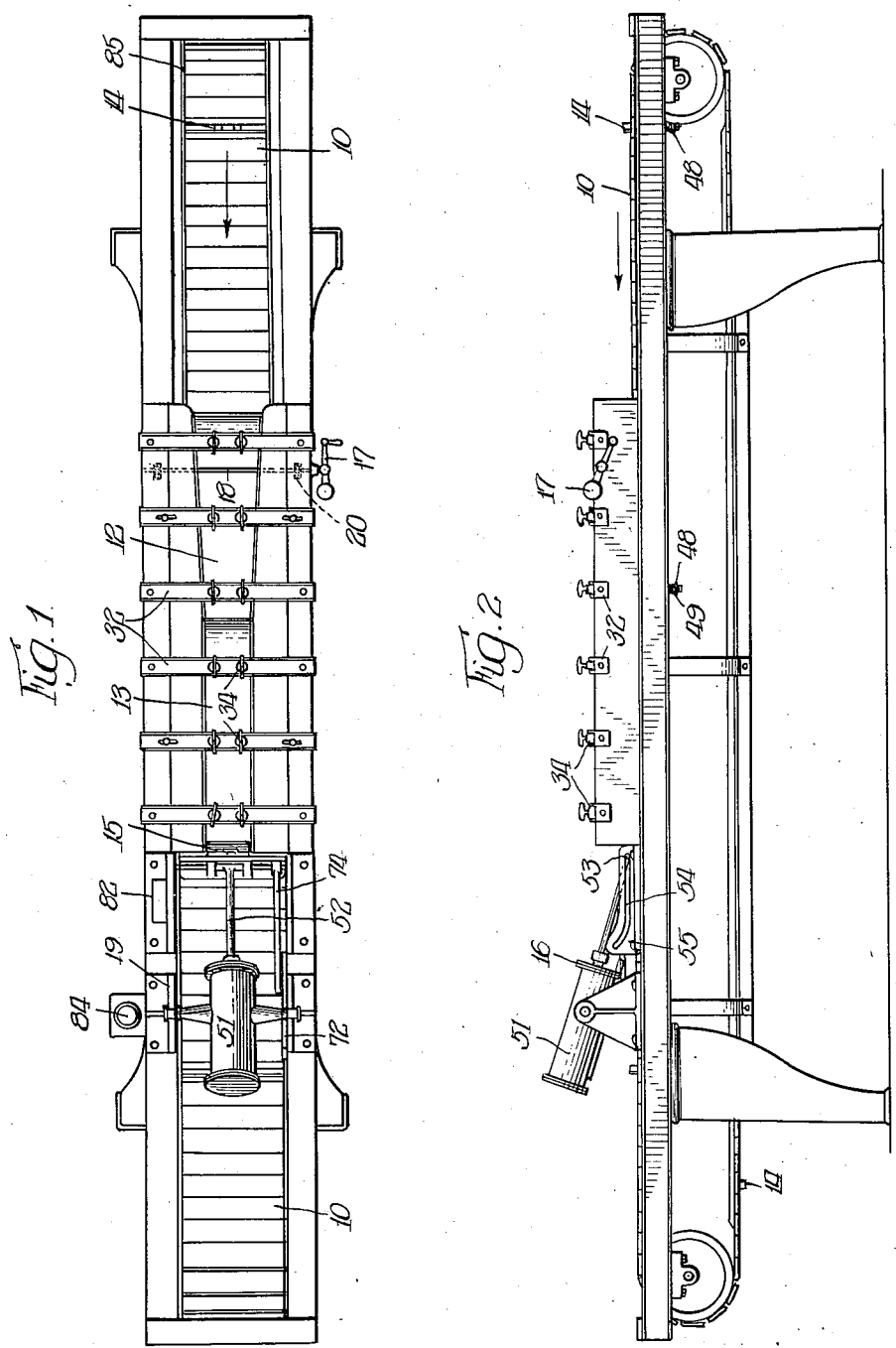
INVENTOR.
Frank P. Maloney,
BY Cromwell, Greist + Warden
ATTORNEYS.

March 10, 1942. F. P. MALONEY 2,275,780
MACHINE AND METHOD OF FORMING MEAT
Filed Oct. 3, 1938 5 Sheets-Sheet 2
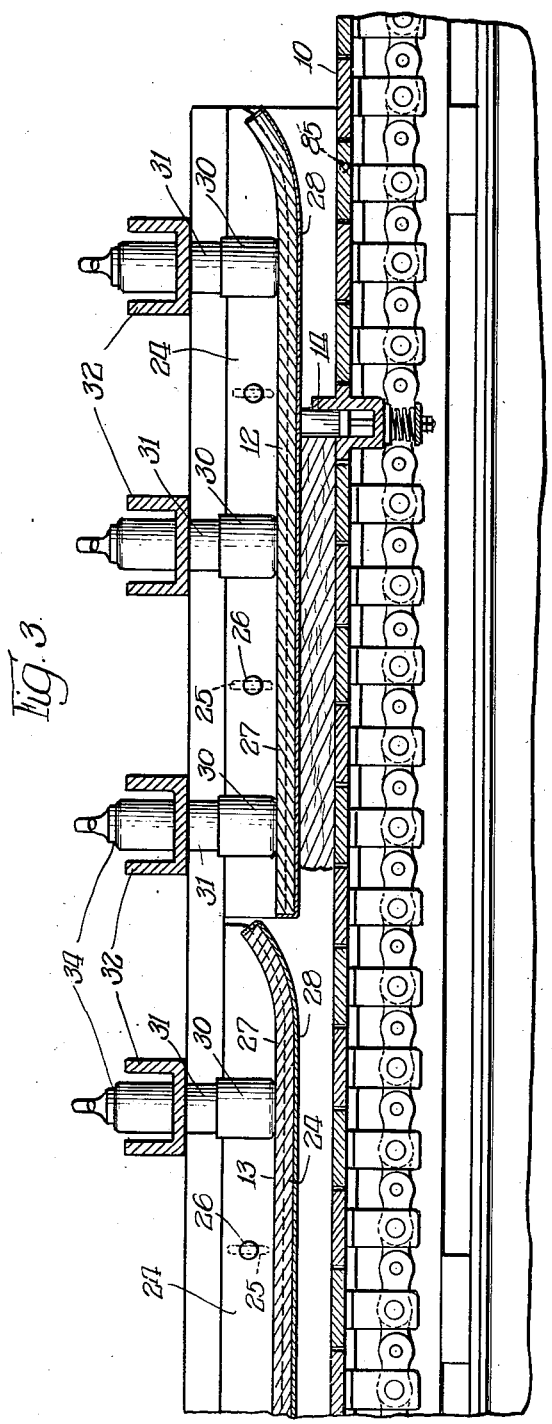
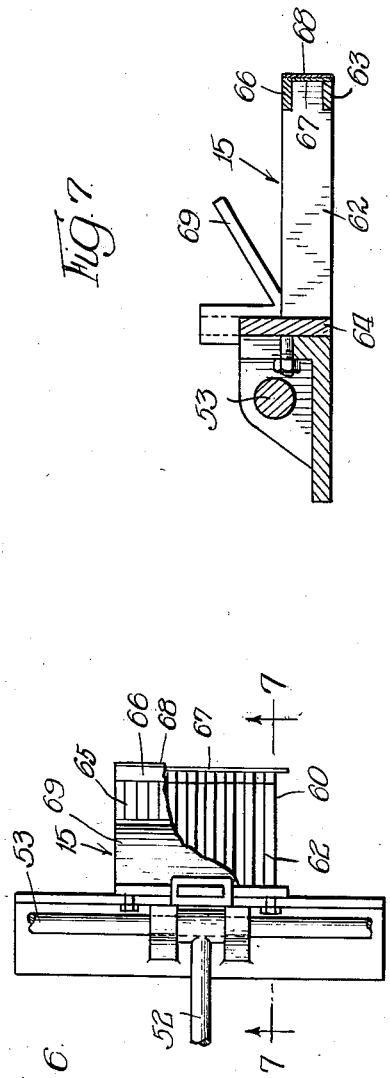
INVENTOR.
Frank P. Maloney,
BY Cromwell, Greist + Warden
ATTORNEYS.

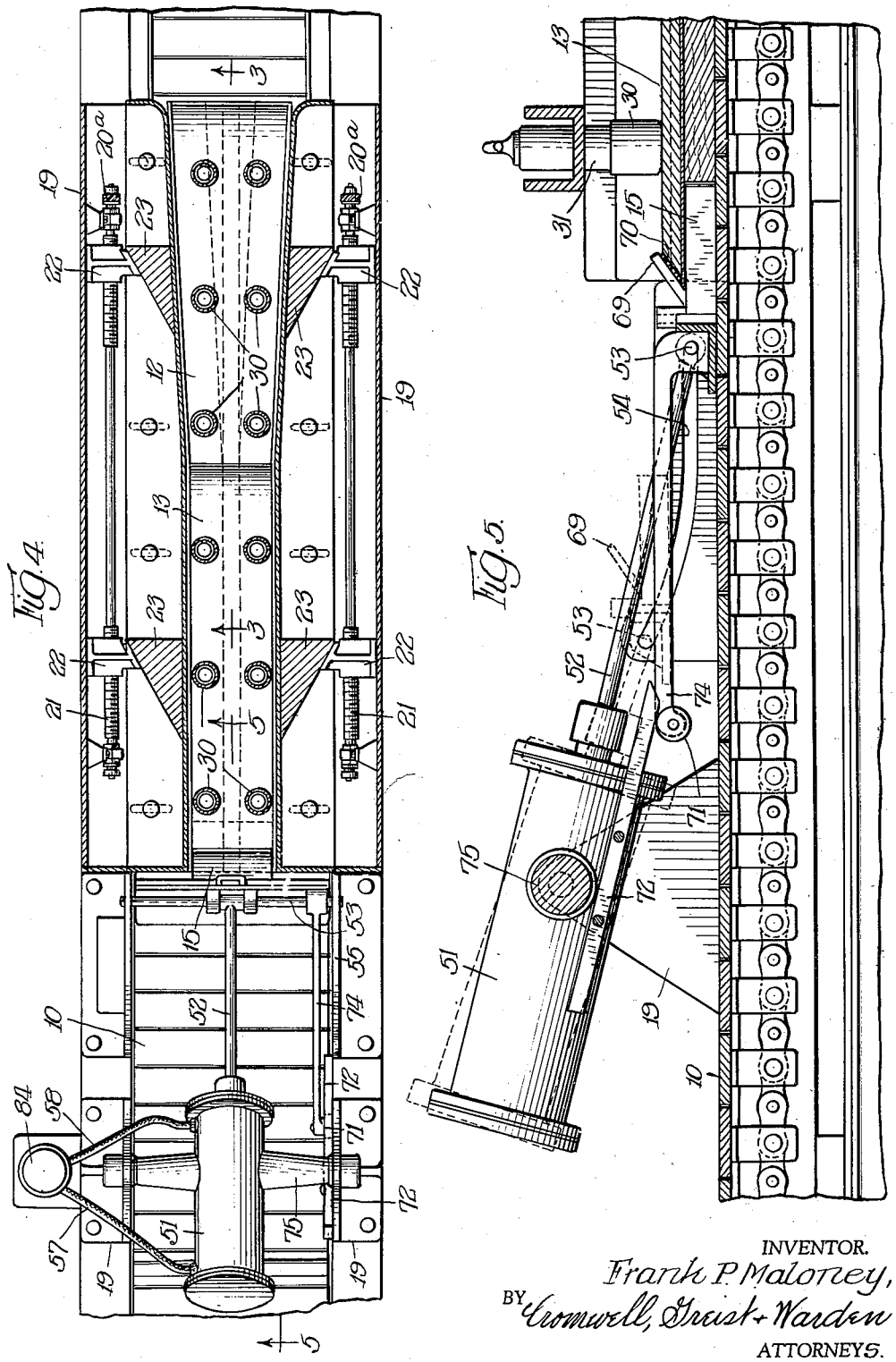

March 10, 1942.  F. P. MALONEY  2,275,780
MACHINE AND METHOD OF FORMING MEAT
Filed Oct. 3, 1938  5 Sheets-Sheet 4
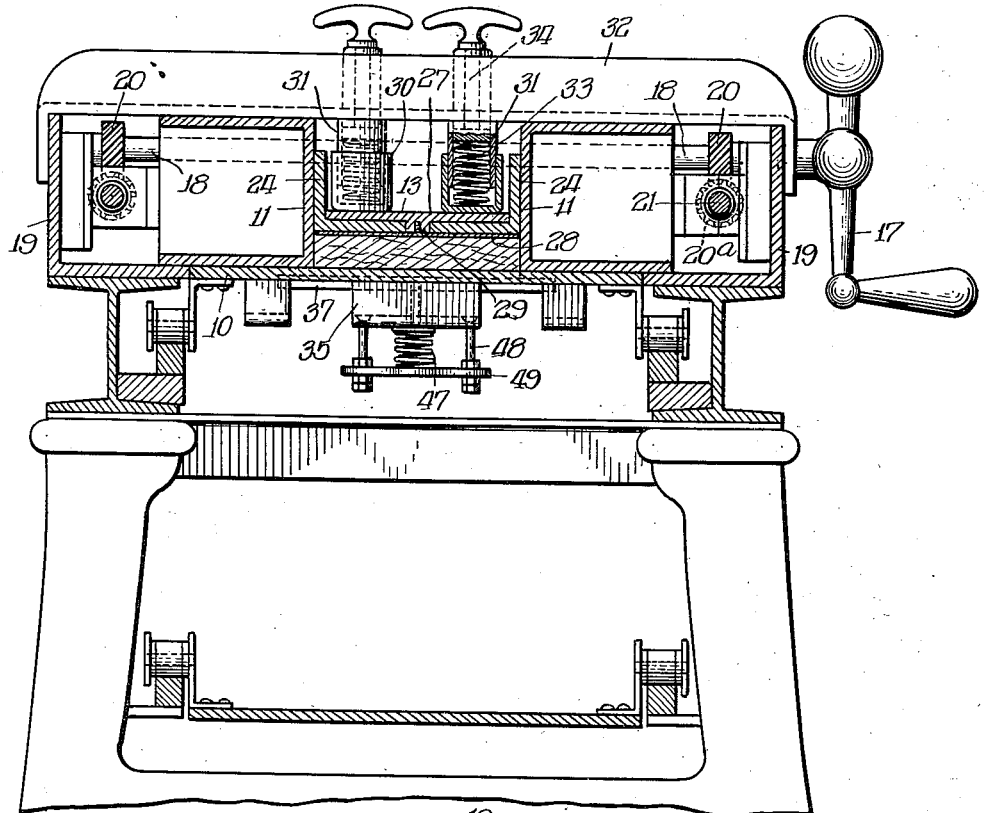
Fig. 8.
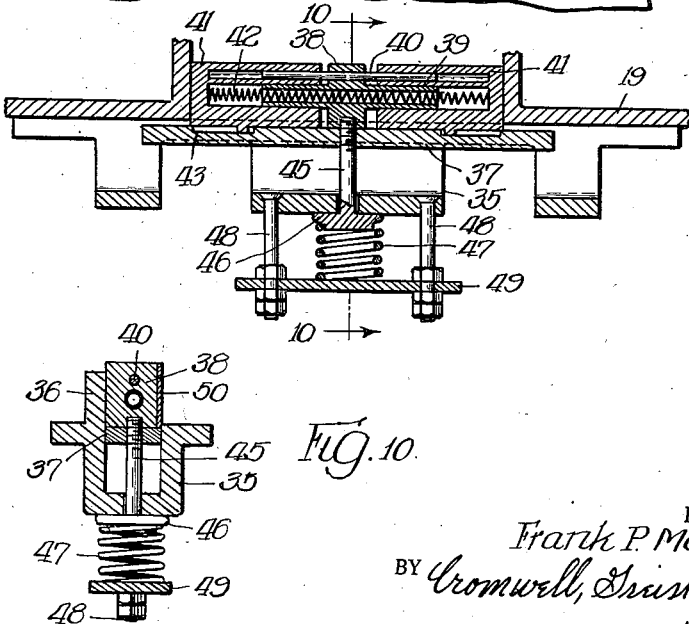
Fig. 9.
Fig. 10.
INVENTOR.
Frank P. Maloney,
BY Cromwell, Greist + Warden
ATTORNEYS.

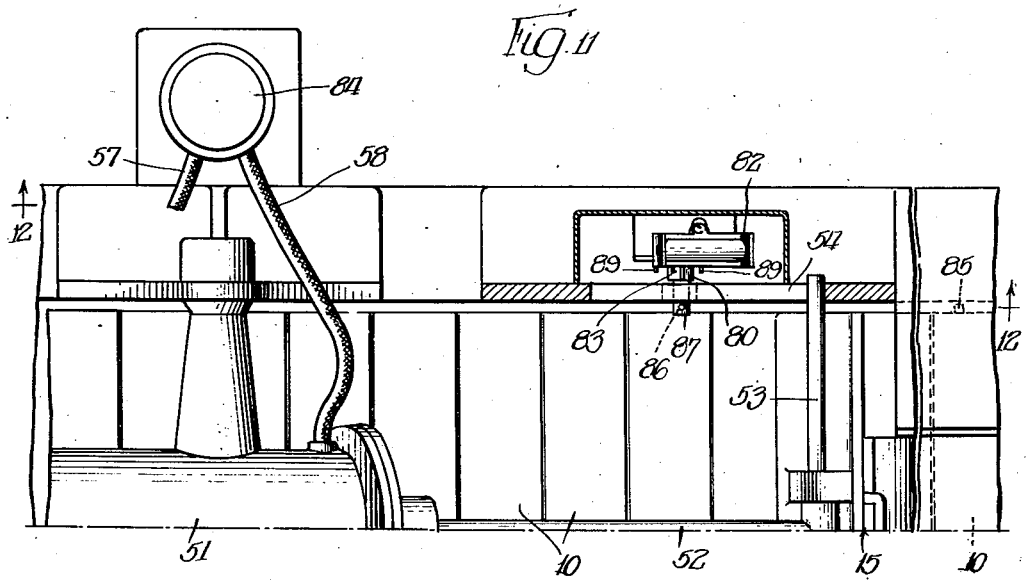

Patented Mar. 10, 1942

2,275,780

UNITED STATES PATENT OFFICE 2,275,780

MACHINE AND METHOD OF FORMING MEAT

Frank P. Maloney, Fort Worth, Tex.

Application October 3, 1938, Serial No. 232,971

13 Claims. (Cl. 100—57)

The present invention relates to a machine and method of forming meat and has particular reference to a means and method of continuously preparing smoked and chilled bellies and the like to secure a more uniform product prior to a slicing operation.

In the processing of sliced bacon today for consumer consumption it is customary to mold the bellies to some extent prior to slicing in an effort to procure uniformity among the slices and to increase the sales appeal to the public. For this purpose today stationary molds are used requiring a heavy investment in molds of varying sizes. Each belly or bacon slab is placed in the molding apparatus separately, and is molded and removed to make room for a further slab. Each belly must be carefully trimmed, sized and the edges substantially squared before it is molded while the bellies must be carefully selected for widths for the various molds. It will thus be seen that the present processing of bellies is relatively slow and requires tedious work of those engaged in this work.

One object of the present invention is to increase the speed and lower the cost of processing meat for slicing.

Another object of this invention is to increase the quantity of meat that may go into a quality product and heretofore considered waste or sold for lesser values.

A further object of this invention is to eliminate the amount of sizing, trimming and selecting heretofore necessary in processing meat for slicing.

A still further object of this invention is to provide a relatively simple and inexpensive means and method of processing various sizes of meat for slicing.

Yet another object of this invention is to provide means for continuously processing a number of variously sized meats for substantially uniform widths, thicknesses and heights.

Other and further objects will be pointed out or indicated hereinafter or will be apparent to one skilled in the art upon an understanding of the present invention or its employment in practice.

For the purpose of facilitating an understanding of the invention, I show in the accompanying drawings forming a part of this specification and hereinafter describe certain forms of apparatus in which it may be embodied and practiced, but it is to be understood that these are presented merely by way of illustration and are not to be construed in any fashion calculated to limit the appended claims short of the true and most comprehensive scope of the invention in the art.

In the drawings:

Fig. 1 is a plan view of a machine for continuously processing meat for uniform sizes;

Fig. 2 is a view in side elevation of the machine shown in Fig. 1;

Fig. 3 is an enlarged sectional view of a part of the machine shown in Fig. 2 and taken on the line 3—3 of Fig. 4;

Fig. 4 is an enlarged plan view of a part of the machine shown in Fig. 1;

Fig. 5 is an enlarged sectional view of a further part of the machine shown in Fig. 2 and is a continuation of Fig. 3 taken on the line 5—5 of Fig. 4;

Fig. 6 is a plan view, partly in section, of a piston operated pressure block;

Fig. 7 is a side elevation taken on the line 7—7 of Fig. 6;

Fig. 8 is a cross sectional view taken on the line 8—8 of Fig. 2;

Fig. 9 is an enlarged sectional view of the machine showing the pusher elements;

Fig. 10 is an enlarged view taken on the line 10—10 of Fig. 9;

Fig. 11 is a plan view of a portion of the machine partially in section; and

Fig. 12 is a sectional view taken on the line 12—12 of Fig. 11.

To accomplish the objects of this invention a piece of meat such as a slab of bacon is moved forwardly along a conveyor mechanism by rear pressure or pusher elements associated therewith and is caused to engage with the sides of an extrusion channel where it is transversely compressed and decreased to some extent in width with light pressure on its top side. Upon further continuous forward movement it is subjected to a further vertical pressure sufficient to cause a displacement of or to extrude some portions of the meat which is pressed outwardly filling the extrusion channel.

A front pressure plate or forward pressure means is applied to the front end of the slab at this time, halting further forward movement of the front end of the slab and the front and rear ends of the slab are formed or squared by pressure on this plate received from the pusher elements. When properly sized, the pressure plate is removed mechanically or automatically at a predetermined instant and the slab moves forwardly upon the conveyor mechanism to a slicing machine for further processing or may be otherwise disposed of.

The extrusion channel is variable in width and height to accommodate reasonable variations in sizes of meat slabs, and the pressures to which a slab is subjected may be easily and readily changed.

The nature of the invention may be most quickly ascertained from a more or less detailed explanation of the apparatus illustrated in the drawings, which will now be described.

With reference to Figs. 1 and 2 it will be seen that there is a conveyor 10 in the form of an endless belt adapted to support the meat slabs to be sized and shaped which are set thereon. This conveyor is suitably driven to move it and the meat in the direction of the arrows. Over a portion of this conveyor is a housing having lateral walls formed by side pressure guides 11 and a top in the form of spring pressed platens 12 and 13 forming an extrusion chamber through which the meat is forced.

By operation of the conveyor the pusher elements 14 cause the meat slab to enter the extrusion channel at the end of the machine shown at the right in Figs. 1 and 2 and to travel progressively forward through the channel and out of its opposite end. Adjacent the exit of this extrusion channel is a piston operated forward pressure block 15 which, together with the platen 12, the platen or shoe member 13, and the side pressure guides 11 form the meat slab into the proper size and shape desired. Upon further continuous forward movement of the conveyor, the pressure block 15 is removed by a retraction of the piston 16 at a speed relatively faster than the travel of the conveyor 10, and the sized and shaped meat slab is carried forwardly out of the extrusion channel.

The guides 11 diverge at the entrance to the extrusion channel to receive and center a slab to be processed. Over these divergent sides is a spring pressed platen or shoe 12 which is upturned adjacent its forward end to receive the meat slab. Vertical pressure from this shoe is relatively light and the primary change in the configuration of the meat is mostly in a lessening of the width caused by the transverse compression of the divergent sides. It is believed that the meat may even be increased in thickness because of this transverse pressure and a slight amount of buckling may take place under this first pressure shoe.

To the rear of the pressure shoe 12 the lateral guide walls form a parallel pressure and extrusion chamber beneath a second pressure shoe 13 which forms a top to the chamber that is variable in height. A strong tension on shoe 13 causes the displacement of the meat outwardly to fill the voids and completely fill the extrusion chamber beneath the shoe 13. As in the shoe 12, the forward end of the shoe 13 is upturned to receive the oncoming slab.

With reference to Figs. 1, 4 and 8 it will be seen that the side pressure guide members 11 are in the form of channel members and are mounted for transverse movement of the conveyor 10 to increase or decrease the width of the extrusion chamber to adjust the same for various widths of meat. The movement of these side members is controlled by a screw mechanism operated by a crank 17 which turns a rod 18 extending across the conveyor 10 and mounted in the frame 19 of the machine. Upon this rod 18 are mounted the gears 20 on either side of the side members 11. Screws 21 are likewise mounted upon the frame 19 and have worms 20a which mesh with the gears 20. These screws 21 extend longitudinally of the side members and have cam members 22 mounted thereon for movement along the screws. Extending outwardly from the side members 11 are further cam members 23 which cooperate with the cam members 22 for controlled movement of the side members.

Upon rotation of the crank 17 in one direction the cam members 22 will be caused to travel along the screws 21 forcing the side members 11 inwardly. Upon operation of the crank in an opposite direction, the cam members 22 will move along the screws 21 to permit the side members 11 to move outwardly under pressure received from a meat slab passing therebetween. Thus the side guide members may be set to give a predetermined width to an approaching meat slab.

The shoes 12 and 13 as may be seen in Figs. 3 and 8, include slotted angle members 24 mounted for vertical movement, by reason of the slots 25 and the studs 26, to the inner faces of the side members 11. These angle members 24 move transversely of the conveyor 10 with the side members. Means is provided to prevent gaps in the center of the shoe with a consequent distortion of the meat. For this purpose, a longitudinally extending strip 27 is disposed over the angle members 24 and rests thereon. This strip has an elongated boss 29 extending into the gap between the inner ends of the angle members 24 and a thin strip 28 of stainless steel is mounted to the strip 27 through this boss 29 below the angle members 24. The angle members slide transversely between these strips 27 and 28 but the gap between the two angle members is always closed by the strip 28.

Mounted above the plate or strip 27 are housings having base sections 30 and upper sections 31 which fit within the base members and are in turn mounted to the bracing members 32. These bracing members extend transversely across the conveyor 10 over the shoes 12 and 13 and are attached to the frame 19 of the machine. Within the housing formed by the sections 30 and 31 are mounted the springs 33 and the screws 34 for regulating the pressure to be placed on the springs and consequently the height of the shoes 12 and 13 above the conveyor 10. It will thus be seen that the shoes 12 and 13 will vary themselves in width and height to fill the extrusion channel at all times depending upon the width and height of meat slab to be received. The width of the thin cover strip 28 may be governed by the desired minimum width of meat to be extruded.

In order to form a substantially square end to the rear end of the meat slab to be processed the pusher element 14 should completely fill the extrusion chamber otherwise the meat slab will have indentations and projections that detract from the appearance of the processed product and uniform slicing might be difficult. For this reason the pusher elements are shown as adjustable and variable automatically with the size of the extrusion chamber and consequently with the size of the rear end of the meat slab passing therethrough.

In Figs. 3, 9 and 10 the rear pressure means or pusher elements 14 that force the meat slab through the extrusion channel are shown. These pusher elements are inserted at spaced intervals along the conveyor 10 and include a substantially U-shaped member 35 mounted transversely of the conveyor with a rear leg 36 extending above the normal conveyor surface.

Slidably mounted within this U-shaped member for vertical movement is a supporting strip 37 and seated upon this strip is a hub-like member 38 hollowed interiorly and having cylindrical side extensions 39 to form inner sections of a telescopic spring housing. A further aperture is shown in the hub-like member to receive a pin 40 therein.

Two complemental sections 41 are hollowed interiorly to slidably receive the side extensions 39 and the rod 40 of the hub-like member. A spring 42 is mounted within the side extensions 39 and tends to press the complemental sections outwardly along the rod 40 and the extensions 39. The supporting strip 37 may be formed with a stop member 43 to prevent lateral movement beyond an operative position.

As may be seen in Fig. 10, the supporting strip 37 and its assembly just described are mounted for vertical movement within the U-shaped member 35 by means of the threaded bolt 45 which extends through the strip 37 into the hub-like member 38 which is threaded to receive it. This stud also extends through the base of the member 35 and the bolt head 46 forms a spring seat for a spring member 47. To support the spring 47 against the bolt 45 an assembly is shown consisting of two threaded bolts 48 extending downwardly from the base of the member 35 with a cross strap member 49 mounted between them and forming a further seat for the spring member 47. Tightening or loosening of the nuts on these bolts will adjust the height of the bolt 45 and the assembly attached thereto. As shown in Fig. 9 the assembly is at a maximum height. When passing beneath a shoe 12 or 13 the pusher element will be forced downwardly against the pressure of spring 47.

In front of the pusher element assembly a thin facing strip 50 of stainless steel is mounted to the hub-like member and is of sufficient width so that a maximum transverse extension of the complemental sections 41 away from the hub-like member, and sliding behind the facing strip 50, will not leave a gap or opening exposed to the rear end of the meat slab.

The pusher element is adjustable above the conveyor 10 for a maximum height and width of meat slab to be processed. When it comes within the diverging sides of the members 11 and below the shoes 12 or 13 it will be decreased in width and height against vertical and transverse spring pressure to a size corresponding to that of the extrusion chamber and will always retain the size of the rear end of the meat slab while passing through the chamber.

To square the front end of the meat slab while in the extrusion chamber and to complete the processing of the meat slab for a slicing operation there is mounted a forward pressure means or block assembly that may be operated mechanically or automatically through electrical means utilizing a solenoid, not shown, or by other well known means.

Mounted on the frame 19 to the rear of the extrusion chamber and over the conveyor is a compression cylinder 51. A piston rod 52 extends outwardly from this cylinder and has attached to it a front pressure block or plate 15 for squaring the front end of the meat slab. Pins 53 extend outwardly from the plate 15 and engage cam slots 54 in upstanding wing members 55 attached to the frame 19.

An air valve housing 56 has air lines 57—58, respectively, leading to opposite sides of the piston head within the cylinder 51. When air is forced through air line 57 the piston and its rod 52 are forced outwardly carrying the pressure plate 15 into the extrusion chamber under the guidance of the pins 53 and the cam slots 54. Upon a forcing of air through line 58 the pressure head is retracted outwardly from the extrusion chamber and above the conveyor 10 by the pin and cam slot arrangement to permit the extruded meat slab to pass underneath upon the conveyor. Preferably the pressure plate 15 is actuated so as to be placed in its forward position within the extrusion chamber slightly before the meat slab has reached that point upon the conveyor.

The forward movement of the front end of the meat slab is halted momentarily by the pressure plate 15 while the continued movement of the rear end of the meat slab under the oncoming pressure of a pusher element 14 causes a flowing of the meat in the slab against the side members 11 and the spring pressed shoe 13. The result is a meat slab uniform in height and width throughout its length and having square ends and sides.

In order to have a squared front end to the meat slab the pressure plate 15 preferably is automatically adjustable to meet varying sizes of meat slabs and changes in extrusion chamber dimensions. In the drawings with special reference to Figs. 6, 7 and 8 one means for obtaining this squared front end is shown.

The pressure plate 15 includes two telescoping sections 60 and 61. The base section 60 is formed of a series of spaced bars 62 notched at their forward lower ends to receive a front supporting strip 63 and at their forward upper ends to accommodate supporting strip 66 and are affixed at their rear ends to a backing member 64. The sliding section 61 consists of a plurality of spaced bars 65, staggered with respect to the bars 62 so that they may slidably interlock for vertical movement. A supporting strip 66 connects these bars 65 together at their forward upper ends while at the rear they are supported by an angled member 69 which serves as a guide means for lowering and raising the upper section 61 within the base section 60. The bars 65 are notched at their forward upper end to receive supporting strip 66 and at their forward lower ends to accommodate supporting strip 63.

Extending upwardly and affixed to the supporting strip 63 of the base section is a thin strip 67 of stainless steel sheet metal extending across the width of the pressure block 15. Extending downwardly from the supporting strip 66 over the thin strip 67 and slidably engaging the same is a further strip 68 of stainless steel sheet metal. As the upper section 61 is raised or withdrawn from its telescoped position within the base section 60, the strips 67 and 68 will remain in contact with the oncoming meat slab without exposing them to gaps or openings between the bars 62 and 65.

At its rear end the shoe 13 is cut away at an angle as shown at 70 in Fig. 5. Upon proper actuation of the piston arm 52, the pressure block 15 is forced beneath the shoe 13. The angle member 69 will strike the angled surface 70 of the shoe 13. The member 69 and the upper section 61 of the block 15 to which it is attached will be raised or lowered out of the base section 60 according to the variable height of the shoe 13 above the conveyor. Consequently the block 15 will always fill the exit to the extrusion chamber and a flat surface will be presented to the meat slab.

As shown the piston rod 52 is attached to the pressure plate by a rotatable mounting upon the pin 53. To prevent a tilting of the forward end of pressure plate 15 and to make positive its entrance into the extrusion chamber, supporting straps 74 are rigidly affixed to the pressure plate 15 and have rollers 71 mounted upon their ends. Guide bars 72 are mounted upon the supporting frame of the cylinder 51 for cooperation with the rollers 71 which run along these bars upon movement of the piston rod 52. The bars 72 and the straps 74 are preferably arranged so that the pressure plate is held in a horizontal position substantially parallel to the surface of the conveyor 10 and is prevented from tilting in any direction.

Preferably the cylinder 51 is pivotally mounted as at 75 within the frame 19 to allow free movement of the piston rod 52 as guided by the cam slot 54 and pin 53 arrangement.

As an example of automatic means for actuating the piston within the cylinder 51 and the consequent movement of the pressure block 15, the structure of Figs. 11 and 12 is referred to. It will be seen that one end of the pin 53 on the pressure block 15 extends beyond its cam slot 54. As pressure is built up against the pressure block 15 by a continuously moving pusher element 14 having a meat slab interposed therebetween, the block 15 will be caused to move slowly outward from the extrusion chamber against the pressure in the cylinder 51. For this purpose the fluid pressure behind the pressure block 15 is less than the pressure exerted by a pusher element 14 as received from the conveyor 10 so that the pressure block yields under the pressure from a pusher element.

In moving outwardly, the extension of the pin 53 may be caused to strike or trip a cam button 80 pivotally attached to a mercuroid switch 82. The button 80 strikes a stop member 83 upon the switch, throwing the latter to the left in the drawing of Fig. 12, thus de-energizing the solenoid 84 by the exposure of the contact points in the switch. Where the solenoid is de-energized, a standard type of valve in the housing 56, not shown but well known, throws the air or other pressure upon the opposite side of the piston in the cylinder 51 through the line 58, causing the block to be moved rapidly out of the extrusion chamber and above the conveyor 10 by means of the cam slot 54 and pin 53.

The extruded slab then passes beneath the pressure block 15 propelled forwardly by a pusher element 14. Spaced behind each pusher element 14 is a boss or trip member 85 on the conveyor 10 which extends outwardly therefrom so that upon a continuous forward movement of the conveyor the trip member will strike a trigger member 86 rigidly affixed to the lower part of the switch 82 below its pivot point 87, throwing the switch to the position shown in Fig. 12. At this time the solenoid is energized, throwing the valve in the housing 56 so that pressure is applied to the cylinder 51 behind the piston and forcing the pressure block downwardly into the extrusion chamber to await another meat slab.

Preferably the trip member 85 is so spaced behind its pusher element that as soon as a clearance has been effected between a pusher element and the suspended block the trip member will come into contact with the trigger member 86 operating the inserting mechanism and forcing the block into the extrusion chamber. Most of the time, therefore, the block will be in its forward position in the chamber. By this arrangement maximum lengths of meat slabs may be accommodated and the block will be released only to permit the passage of the extruded product.

Upon the forward movement of the pressure block 15 into the extrusion chamber the pin 53 will again strike the cam button 80, which will pivot or rotate to allow the pin to pass and will be returned to position by the spring member 88. Stop members 89 are placed on either side of the switch 82 to limit its movement. A spring member 90 may be used in connection with the switch 82, which will tend to urge the switch to one or the other of its positions upon passing dead center.

From this description it will be apparent that the extruding action effected by this machine is different from the usual pressing action achieved by present day molds. The latter cannot effect a flowing of the meat. The continual increasing load upon the meat slab under the rocking movement of the platens or shoes 12 and 13 while the meat is forcibly sliding thereunder is lacking in the press molded product. An actual flow of the meat without harmfully effecting its structure is accomplished through this extrusion, or forceful propelling of the meat through the chamber.

A meat slab, such as bacon, may be formed into a desirable shape and the resultant product is superior to one subjected to the ordinary pressing operation as the meat structure has not been disturbed to as great an extent. If bacon is to be extruded it is preferably first smoked and chilled by well known processes, and then by a continuous process it is caused to flow to a size having an even cross sectional thickness with square sides and ends.

Various modifications of the structure and method as described and shown may be made without departing from the invention. All such modifications are intended to come within the spirit and scope of the appended claims.

I claim:

1. In an apparatus for extruding meat slabs, in combination, conveyor means for moving meat slabs progressively in a series, an extrusion chamber arranged over said conveyor means, side guide means forming side walls of said chamber, said side guide means being variable to give a predetermined width to said meat slabs, pressure shoes forming the top of said chamber, said pressure shoes being variable in width to fit variations in the width of the side walls of said chamber, and means associated with said conveyor means for positively forcing said meat slabs through said extrusion chamber.

2. In an apparatus for extruding meat slabs, in combination, conveyor means for moving meat slabs progressively in a series, an extrusion chamber arranged over said conveyor means having side walls and a pressure variable top wall, forward pressure means extendible into said extrusion chamber for halting the progressive movement of the front end of said meat slabs, said forward pressure means being retractable from said extrusion chamber, and means associated with said conveyor means for positively forcing said meat slabs through said extrusion chamber.

3. In an apparatus for extruding meat slabs, the combination with an extrusion chamber having a top and side walls and a conveyor means for meat slabs passing therethrough, of means for forming the forward ends of said meat slabs in said chamber, including a pressure withstanding means insertable within said extrusion chamber upon the approach of a meat slab along said conveyor means to halt the progress of its forward end, and means for retracting said pressure means to permit the meat slab to progress along said conveyor means.

4. An apparatus as claimed in claim 3 wherein the top of the extrusion chamber and the insertable pressure withstanding means are variable in height, and means associated with said top and pressure withstanding means to vary the height of the latter to correspond to the height of said chamber top.

5. An apparatus as defined in claim 3 wherein the top of the extrusion chamber and the insertable pressure withstanding means are variable in height, the latter being formed of telescoping sections, and means associated with said top and a telescoping section to vary the height of the pressure withstanding means to correspond to the height of said chamber top.

6. In an apparatus for extruding meat slabs to an even cross sectional area throughout their length, with squared ends and sides, in combination, conveyor means for moving meat slabs progressively in a series, side pressure guide means arranged along said conveyor means for forming said meat slabs to predetermined widths, spring pressed pressure shoes mounted over said conveyor means and forming an extrusion chamber with said guide means and conveyor means through which said meat slabs must pass, a forward pressure means, variable with the size of said extrusion chamber for forming the forward ends of said meat slabs to a desired shape, said forward pressure means being retractable from said extrusion chamber to permit said meat slabs to progress along said conveyor, and rear pressure means associated with said conveyor means for positively forcing said meat slabs through said extrusion chamber, said rear pressure means being variable in size to fit the inner dimensions of said extrusion chamber as it passes therethrough.

7. In an apparatus for extruding meat slabs, in combination, conveyor means for moving meat slabs progressively forward, an extrusion chamber arranged over said conveyor means to receive a meat slab and conform said slab to chamber dimensions, pusher means associated with said conveyor for positively forcing said meat slabs through said extrusion chamber, forward pressure means extendible into said chamber for halting the progressive movement of the front end of a meat slab, said forward pressure means being yieldable under pressure from said pusher means, means for rapidly retracting said pressure means from said extrusion chamber, and means associated with said pressure means for operating the retracting means while said pressure means is yielding under pressure from the pusher means.

8. In an apparatus for extruding meat slabs, in combination, conveyor means for moving meat slabs progressively in a series, an extrusion chamber arranged over said conveyor means, spaced pusher means associated with said conveyor means for forcing said meat slabs through said chamber in a series, and a pressure block insertable within said chamber at spaced intervals between said spaced pusher means to press against an oncoming meat slab.

9. In an apparatus for extruding meat slabs, in combination, conveyor means for moving meat slabs progressively in a series, an extrusion chamber arranged over said conveyor means, spaced pusher means associated with said conveyor means for forcing said meat slabs through said chamber in a series, a pressure block insertable within said chamber at spaced intervals between said spaced pusher means to press against an oncoming meat slab, means for rapidly retracting said pressure block from said chamber over said conveyor, means for inserting said pressure block into said chamber, and spaced operating means associated with said conveyor means behind said pusher means for operating said inserting means upon the passage of a pusher means beneath said pressure block.

10. A method of forming meat slabs by causing a flowing of the meat to a desired configuration including bringing a continuous forward pressure on the rear end of a slab, to force said slab through a die, which confines the sides and bottom of the slab to a predetermined width and configuration while bringing a yielding pressure against the upper side of the slab, bringing a yielding pressure against the forward end of the slab of a desired front end shape until a desired configuration of the slab is obtained.

11. A method of forming meat slabs to a desired configuration by causing a flowing of the meat in the slab including supporting the bottom of the slab while bringing a continuous forward pressure against the rear edge of the slab, to force the same through an extrusion die, which confines the sides of the slab to a predetermined width while causing a yielding pressure to be applied to the top side of the slab against the bottom support pressure and the pressure from the confining side pressure and bringing a yielding pressure against the forward edge of said slab against the forward pressure from the rear edge of said slab to cause a desired configuration of the meat slab among the said pressures.

12. A method of forming meat slabs by causing a flowing of the meat to a desired configuration including supporting the bottom of said slab while moving it forwardly by continuous pressure upon its rear edge, forcing said slab through an extrusion channel which gradually confines the sides of said slab to a predetermined width while gradually causing a flowing of the meat in said slab by a yielding pressure action upon the top side thereof, and applying a yielding pressure against the forward movement of said meat slab at its forward edge to obtain a desired configuration at that end against the other pressures on said meat slab while passing said slab through said extrusion channel.

13. In an apparatus for extruding meat slabs, in combination, conveyor means for moving meat slabs progressively in a series, an extrusion chamber arranged over said conveyor means, said chamber having side guide means and a top pressure means, and forcing means associated with said conveyor means for positively forcing said meat slabs through said extrusion chamber, said forcing means being variable in width and height to fit the interior dimensions of said chamber.

FRANK P. MALONEY.